March 10, 1959   M. BURTON ET AL   2,877,171
MEANS FOR SHIELDING REACTORS
Filed Nov. 2, 1945
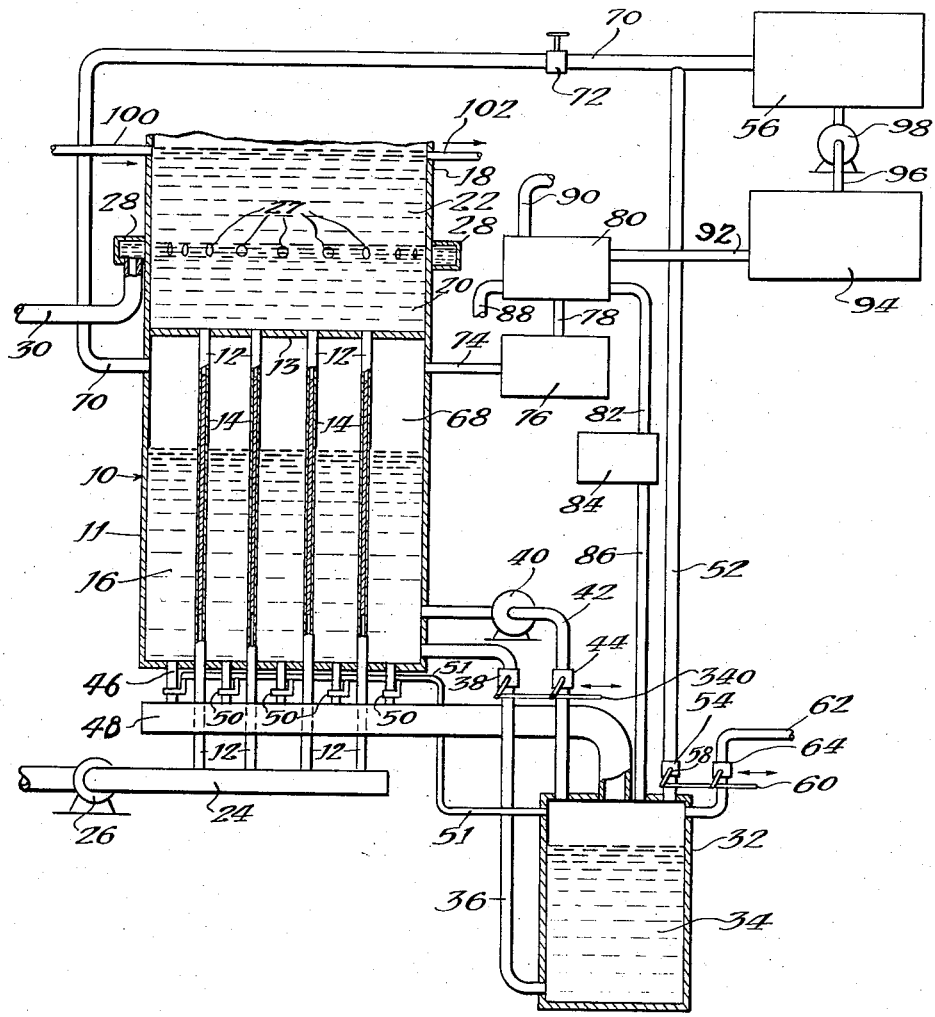
Witnesses:
Inventors:
Warren M. Garrison
Leslie T. McClinton
Milton Burton
By
Attorney

2,877,171

MEANS FOR SHIELDING REACTORS

Milton Burton and Leslie T. McClinton, Oak Ridge, Tenn., and Warren M. Garrison, Richland, Wash., assignors to the United States of America as represented by the United States Atomic Energy Commission Application November 2, 1945, Serial No. 626,384

1 Claim. (Cl. 204—193.2)

This invention relates to neutronic reactors, and more particularly to a novel means for shielding such reactors to protect operating personnel from high energy neutrons.

In neutronic reactors, a neutron fissionable isotope, such as $U^{233}$, $U^{235}$, or $94^{239}$, or mixtures thereof, is subjected to fission by absorption of neutrons, and a self-sustaining chain reaction is established by the neutrons evolved by the fission. In general such reactors comprise bodies of compositions containing such fissionable material, for example, natural uranium, disposed in a neutron slowing material which slows the neutrons to thermal energies. Such a slowing material is termed a neutron moderator. Carbon, beryllium, and $D_2O$ (heavy water) are typical moderators suitable for such use. Heat is evolved during the reaction which is removed by passage of a coolant through the reactor in heat exchange relationship therewith.

The present invention relates more specifically to the use of an organic hydrogenous shielding fluid, and particularly to a hydrocarbon fluid which is hereby broadly defined to include aromatic compounds as well as aliphatic compounds, both saturated and unsaturated. Such a shield is advantageous in reducing to a minimum the possibility of the occurrence of explosive gaseous mixtures under neutron bombardment, and it has been discovered that ordinary straight chain hydrocarbons are effective and conjugated double-bond hydrocarbons are highly effective in reducing the probability of the formation of explosive mixtures.

It may be noted that the invention comprehends a radiation shield of highly polymerized aromatic or aliphatic compounds such as those produced by the bombardment of benzene, biphenyl and their compounds with high speed particles, such as electrons, deuterons or neutrons; and it will be understood that the neutron bombardment of a shielding fluid, such as biphenyl, associated with a neutronic reactor produces a highly polymerized compound which is particularly resistant to penetration by radioactive emanations from the nuclear fission chain reaction.

In addition, other hydrocarbons may be used as a fluid shield including octane, isooctane, heptane, hexane, methane, ethylene, propylene, butylene, xylene, toluene, or the polymers or other products formed by bombardment of these compounds with neutrons, deuterons or electrons.

An object of the invention is, therefore, to provide a hydrocarbon shield for a neutronic reactor.

Another object of the invention is to provide highly conjugated double-bond hydrocarbon structures adapted to shield a reactor.

Still another object is to provide a shield of highly polymerized aromatic or aliphatic compounds.

The foregoing and other objects and advantages of the invention will become apparent from a consideration of the following specification and the drawing which is a flow diagram of a neutronic reaction system embodying the present invention.

Describing the invention in detail, and referring to a preferred embodiment thereof illustrated in the drawing, the neutronic reactor 10 comprises a container or reaction tank 11 which is vertically pierced with a relatively large number of conduits or tubes 12, only four of which are shown diagrammatically, said tubes enclosing natural uranium rods 14 and being surrounded by heavy water 16 which serves as a neutron moderator.

A shield tank 18 is provided above the reactor 10 and contains a clear fluid such as water 20 immediately above the reactor, and a clear low volatility hydrocarbon liquid 22 floating on the water 20. The tubes 12 open through the reaction tank top 13 into the shield tank 18 and are supplied through the lower ends thereof from a cooling water supply header 24 into which cooling water may be forced by a pump 26 from a source of cooling water not shown. The cooling water introduced through the header 24 flows upwardly through the tubes 12, around the uranium rods 14, and into the shield tank 18 from which it is withdrawn through orifices 27 leading to a discharge header 28 surrounding the shield tank 18 and from which the discharge water may be withdrawn through a pipe line 30. A closed system for the water 20 may be employed if desired. The reaction tank 11 is only partially filled with the heavy water moderator 16 for purposes of controlling the neutronic reaction reproduction ratio, as later described in greater detail, from a heavy water reservoir 32, the level of heavy water 34 in the reservoir being determined by the maximum requirement for heavy water in the reaction tank 11. More particularly, the heavy water reservoir may be maintained under pressure and the heavy water may be introduced to the reaction tank through a pipe line 36 under control of a valve 38. Excess heavy water may be pumped from the reaction tank 11 to the reservoir 32 by a pump 40 operating through a pipe line 42 and valve 44.

The effective size of the reactor 10 is determined by the quantity of heavy water in the reaction tank 11 and since an excessive quantity of heavy water in the reaction tank 11, over and above critical size conditions, may result in a rapid exponential rise in neutron density, means are provided for dumping the heavy water rapidly from the tank 11 in the form of a number of emergency pipe lines 46 connected between the bottom portion of the reaction tank 11 and a heavy water outlet header 48 leading to the heavy water reservoir 32. Each of the emergency pipe lines 46 is provided with a safety control valve 50 maintained in a closed position by gas pressure applied through pipe lines 51 from the heavy water reservoir 32. Such pressure is preferably maintained by helium gas introduced to the heavy water reservoir 32 through a pipe line 52 and valve 54 from a helium reservoir 56. During reactor operation, the valve 54 is maintained in an open position by a valve lever 58 connected to a control rod 60, and in the event that rapid dumping of the heavy water in the reaction tank 11 is desired, the helium pressure in the reservoir 32 may be reduced rapidly by opening the reservoir to the atmosphere through a line 62 by opening a valve 64 also operated by the control rod 60. Release of pressure in the reservoir 32 likewise releases pressure in the pipe lines 51 connected to the dump valves 50 causing them to open and the heavy water moderator 16 to be dumped rapidly into the reservoir 32. Thus when one valve, such as the valve 64 is in a closed position the other, such as valve 54, is in an open position.

During operation, the reaction tank 11 is maintained only partially filled with the heavy water 16 leaving a space 68 above the heavy water for release of gases therefrom produced during operation of the reactor, although it is to be understood that during operation of the reactor the level of the heavy water 16 covers the uranium rods 14, the drawing for clarity showing a filling level of heavy water. For example, during operation of a neutronic reaction system utilizing a heavy water moderator, decomposition products, such as deuterium and oxygen, are formed from the heavy water. Such decomposition products are collected in the space 68 above the heavy water moderator and are diluted and swept from the reaction tank by a flow of helium introduced through a line 70 from the helium reservoir 56 as controlled by valve 72. The flow of helium over the heavy water entrains the gaseous decomposition products that are vented through an exhaust pipe line 74. Since the decomposition products are predominantly deuterium and oxygen these gases may be recombined in a recombination chamber 76 connected to the exhaust pipe line 74. The recombination chamber 76 may enclose a catalytic agent such as platinized charcoal maintained at an elevated temperature or a hot grid over which the gases are driven by the helium to be recombined into heavy water vapor. Such vapor is withdrawn from the chamber 76 through a pipe line 78 and led to a heavy water condenser 80 for condensation of the vapor, whereupon the condensed heavy water is returned to the reservoir 32 through a line 82, heavy water purifier 84, and line 86. The condenser 80 is cooled by a fluid medium such as water introduced thereto through inlet line 88, and withdrawn through an outlet 90. The helium is withdrawn from the condenser 80 through a line 92 leading to a helium purifier 94 where other gaseous products that may be formed in the reactor are removed, whereupon the helium is returned through a pipe line 96 and pump 98 to the helium reservoir 56.

In the operation of the system shown and so far described, the neutronic reaction within the reactor 10 develops considerable energy in the form of beta and gamma rays as well as kinetic energy from the fission products. A great portion of this energy is released within the tubes 12 extending vertically through the reaction tank 11 and is absorbed by the flow of water through these tubes around the uranium rods 14. However, some of the neutrons developed in the reactor, as well as high intensity gamma rays, escape therefrom and may result in a great health hazard to operating personnel. With the above-described arrangement of the water and hydrocarbon fluid in the shield tank 18, considerable protection is offered for operating personnel above the neutronic reactor, although it is preferred to provide additional shielding completely surrounding any source of neutrons and gamma rays. Consequently, the reactor is placed between heavy shields (not shown) so that operating personnel may approach the equipment for servicing purposes.

In the illustrated embodiment of the invention, the shielding fluid 22 is circulated through the chamber 18 above the coolant water 20 by inlet and outlet pipes 100 and 102, respectively. However, it will be understood that, if desired, the coolant water may be replaced by a shielding hydrocarbon, such as above described, and the shielding fluid may thus perform the dual function of cooling the uranium members 14 and shielding the reactor. Further, the hydrocarbon fluid may be disposed in suitable containing means about the reactor to shield personnel, and may be separated from the coolant in the form shown.

It will be understood that the above-described embodiment of the invention is diagrammatic and an operative reactor of this type may be constructed in accordance with the teachings of Figs. 2 and 3 and the accompanying specification of copending application, U. S. Serial No. 681,252 filed July 3, 1946 in the joint names of Wigner, Ohlinger, Young and Weinberg now U. S. Patent No. 2,770,591, issued November 13, 1956.

Full details of the method of constructing and operating nuclear reactors are also disclosed in the specification of copending application, U. S. Serial No. 568,904, filed December 19, 1944, in the joint names of Enrico Fermi and Leo Szilard, now Patent 2,708,656, dated May 7, 1955.

While the theory of nuclear reactions set forth herein is based on the best presently known experimental evidence, the invention is not limited thereto, inasmuch as additional experimental data later discovered may modify the theory disclosed.

Obviously, many modifications may be made in the specific embodiment disclosed without departing from the intended scope of the invention which is limited only by the appended claim.

What is claimed is:

A neutronic reactor comprising a reaction tank, a plurality of vertically disposed tubes within said tank, elongated bodies containing material fissionable by neutrons of thermal energy disposed within the tubes, a body of heavy water at least partially filling the tank, the elongated bodies being spaced from the interior walls of the tubes to provide passages, means to flow coolant water upwardly through said passages in heat exchange relationship with said bodies and tubes, a shield tank disposed above the reaction tank through the bottom of which the upper ends of the tubes extend, a body of coolant water in the shield tank submerging the upper ends of the tubes, and a body of unsaturated liquid hydrocarbon floating on the coolant water, the unsaturated liquid hydrocarbon being selected from the group consisting of biphenyl, xylene, toluene and polymers thereof and polymers of ethylene, propylene and butylene formed by bombardment with radiation originating in the reactor.

References Cited in the file of this patent
UNITED STATES PATENTS

| | | |
|---|---|---|
| 2,708,656 | Fermi et al. | May 17, 1955 |

FOREIGN PATENTS

| | | |
|---|---|---|
| 114,150 | Australia | May 2, 1940 |
| 861,390 | France | Oct. 28, 1940 |
| 233,011 | Switzerland | Oct. 2, 1944 |

OTHER REFERENCES

Hopwood et al.: "Proceedings of the Physical Society," vol. 50, pp. 438–440, 1938.

Kelly et al.: "Physical Review," 73, 1135–9, 1948.

Schoepfle et al.: "Industrial and Engineering Chemistry," vol. 23, No. 12, December 1931. Article entitled "Gaseous Products from Action of Cathode Rays on Hydrocarbons," pp. 1396–1398.

Hopwood et al.: "Nature," vol. 136, p. 1026 (1935).

Von Halban et al.: "Nature," vol. 136, p. 951 (1935).

Harkins: "Science," vol. 83, No. 2162, June 5, 1936, Article entitled "Nuclear Chemistry, the Neutron and Artificial Radioactivity," pp. 533–543 (page 541 only pertinent).